United States Patent [19]

Hislop

[11] Patent Number: 4,532,520

[45] Date of Patent: Jul. 30, 1985

[54] TARGET DETECTION SYSTEMS

[75] Inventor: Thomas H. Hislop, Isle of Wight, England

[73] Assignee: Plessey Overseas Limited, Ilford, England

[21] Appl. No.: 321,777

[22] Filed: Nov. 16, 1981

[30] Foreign Application Priority Data

Nov. 19, 1980 [GB] United Kingdom ................. 8037180
Oct. 13, 1981 [GB] United Kingdom ................. 8130876

[51] Int. Cl.³ .......................... H01Q 3/00; H01Q 3/22
[52] U.S. Cl. .................................... 343/373; 343/372
[58] Field of Search ................ 343/16 R, 12 A, 55 M, 343/17.1 PW, 372, 373, 374, 371, 16 T

[56] References Cited

U.S. PATENT DOCUMENTS 3,680,100  7/1972  Woerrlein ..................... 343/16 R X
3,978,482  8/1976  Williams et al. ................. 343/372 X
3,997,900  12/1976  Chin et al. ........................... 343/373
4,318,104  3/1982  Enein .................................. 343/372

Primary Examiner—Theodore M. Blum
Assistant Examiner—Brian Scott Steinberger
Attorney, Agent, or Firm—Fleit, Jacobson, Cohn & Price

[57] ABSTRACT

A radar, lidar, or sonar system, comprising a transmitter and a receiver, the receiver including means for forming a plurality of contiguous receiver beams so as to define a predetermined angular sector of cover and means for narrowing each of the beams while contiguity is maintained between them, whereby the angular sector of cover is reduced for longer ranges.

4 Claims, 3 Drawing Figures

TARGET DETECTION SYSTEMS

This invention relates to target detection systems and more especially it relates to radar systems although it may also find application in sonar or lidar systems.

After the transmission of a radar pulse it is known to collect echo signals of the transmitted pulse from a relatively wide angular sector by forming a plurality of relatively narrow contiguous receiver beams so that each beam covers a small sub-sector of the relatively wide angular sector, echo signals from each beam being received contemporaneously. Such a system might be used in a height finder radar wherein the height of a target is indicated in dependence upon the particular beam in which echo signals are received.

Beam width increases with range and it will be appreciated therefore that resolution decreases correspondingly with range with obvious disadvantages especially at longer ranges.

According to the present invention a radar, lidar, or sonar system, comprises a transmitter and a receiver, the receiver including means for forming a plurality of contiguous receiver beams so as to define a predetermined angular sector of cover and means for narrowing each of the beams whilst contiguity is maintained between them, whereby the angular sector of cover is reduced for longer ranges.

The invention is primarily applicable to radar systems wherein the transmitter is arranged to transmit radar pulses of microwave energy.

The beams may be narrowed progressively or alternatively they may be narrowed in two or three discrete steps whereby the angular sector is reduced with the progress of time after each radar pulse is transmitted and as the range from which echo signals of the transmitted radar pulse are received increases.

Thus it will be appreciated that at longer ranges resolution will be improved.

The beam forming means are well known and may comprise a Rotman lens, or a Butler Matrix, or a Blass Matrix for example fed from a receiving array having a plurality of elements. By controlling the characteristics of such matrixes it is well within the scope of those skilled in the art to control the beam width as required. Alternatively it may be arranged progressively to blend or switch in steps between the output ports of a Rotman lens to achieve a similar effect.

Beam forming may be effected at I.F. frequency or R.F. frequency and the beam former might be proceeded by appropriate amplification stages.

Some embodiments of the invention will now be described by way of example with reference to the accompanying drawings wherein corresponding parts of the various figures bear as appropriate the same designations and in which.

Figure 1:
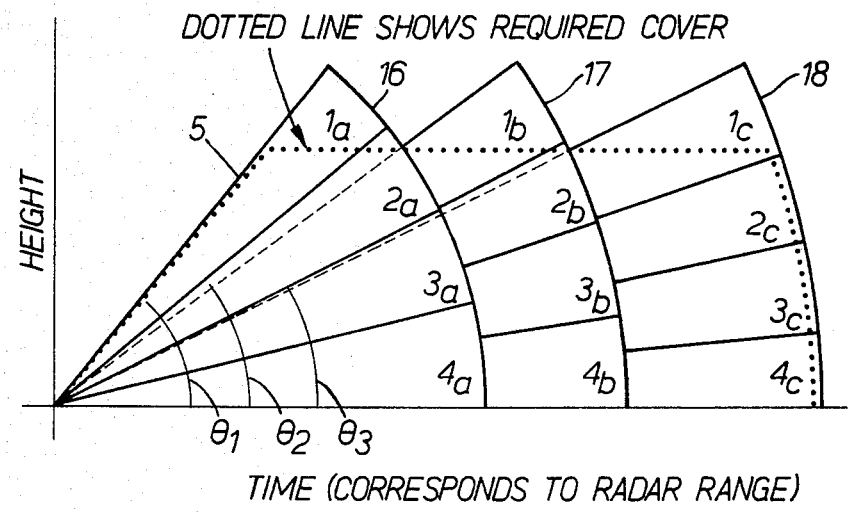
FIG. 1 is a generally schematic diagram showing the radar cover afforded by a radar system.

Referring now to FIG. 1, the diagram appertains to the coverage afforded by a height finder radar. The radar receiver is arranged to cover in elevation a sector comprising four contiguous subsectors 1, 2, 3, and 4 which are suffixed a. b. or c. in dependence upon range.

The subsectors suffixed a. appertain to short ranges whereas the subsectors suffixed b. appertain to intermediate ranges and the subsectors suffixed c. appertain to longer ranges. The angular sector of cover produced by the subsectors a. is $\theta_1$, the angular sector of cover produced by the subsectors b. is $\theta_2$ and the angular sector of cover produced by the subsector c. is $\theta_3$. Thus it can be seen that the subsectors are narrowed as the range increases whilst maintaining contiguity between them so that the angular sector of cover is reduced from $\theta_1$ through $\theta_2$ to $\theta_3$. A broken line 5 indicates the radar cover required and it can be seen from FIG. 1 that since the beam width is reduced as the range increases, all beams remain effective even at the longest range required. It will be appreciated therefore that by utilizing a system affording radar cover as shown in FIG. 1, good resolution can be maintained even at extremes of range.

Figure 2:
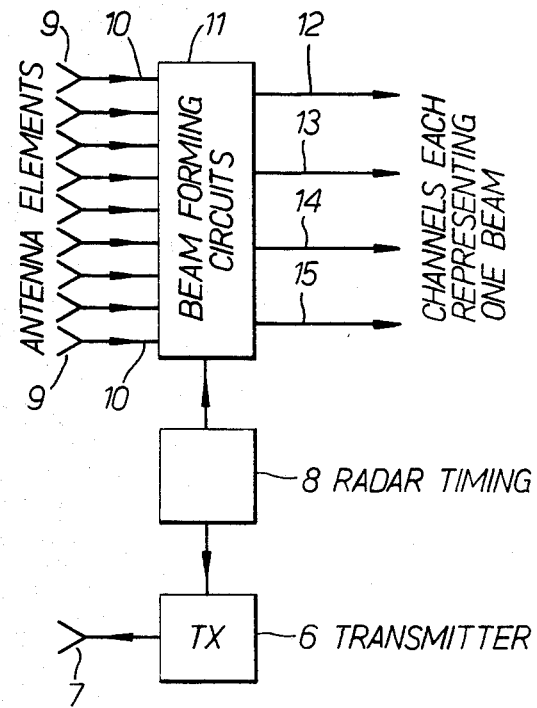
FIG. 2 is a generally schematic block diagram of a radar system for affording the coverage shown in FIG. 1.
Figure 3:
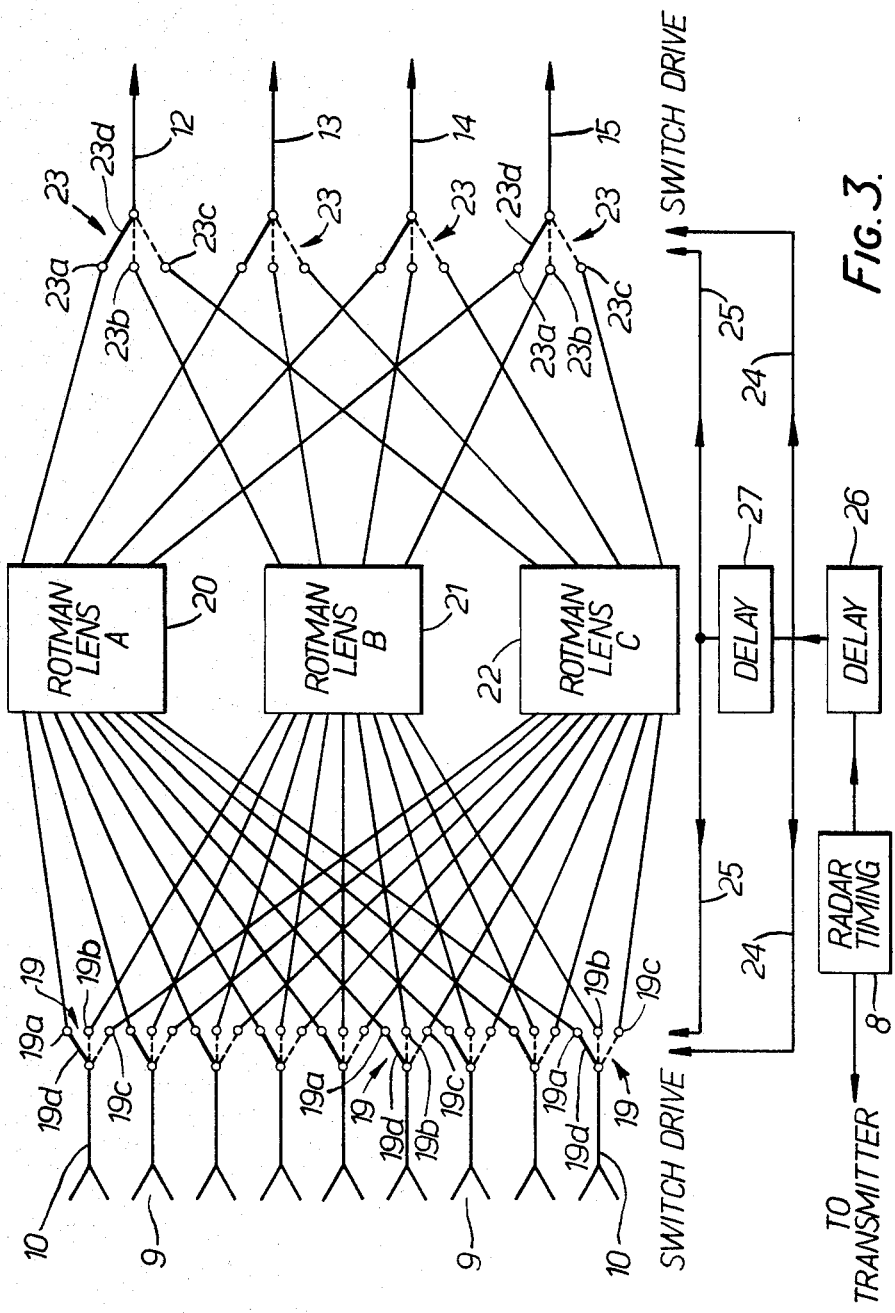
FIG. 3 is a generally schematic block diagram showing parts of the system shown in FIG. 2 in greater detail.

A radar system for producing cover as shown in FIG. 1 may be fabricated as shown in FIG. 2 and FIG. 3. The system comprises a transmitter 6 including a transmitter aerial 7 from which radar pulses are radiated. The transmitter 6 operates under control of radar timing circuits 8. Echo signals of each transmitted pulse are received via a plurality of receiving antennae 9, signals from which are fed on lines 10 to a beam forming circuit 11 which might comprise a Rotman lens a Blass Matrix or a Butler Matrix. The beam forming circuit 11 operates to produce the beam shown schematically at 1, 2, 3, and 4 in FIG. 1 and signals from each beam are delivered on lines 12, 13, 14, and 15 respectively. Thus if a target is detected in the area covered by the beam 1, a signal will be produced on the line 12 whereas if a target is detected in the region covered by the beam 4 a signal will be produced on the line 15. Thus it will be appreciated that the height of an aircraft will be indicated in dependence upon which of the lines 12, 13, 14, or 15 a signal is received. The beam forming circuits 11 are controlled so that the beam width of the subsectors 1a, 2a, 3a and 4a is reduced so that all beams are effective up to the range indicated by the line 16. At this point the beam forming circuits are switched so as to narrow the beams so that they cover the subsectors 1b, 2b, 3b and 4b until the range indicated by the line 17 is reached. At the range indicated by the line 17, the beam forming circuits are again switched so that the subsectors are again narrowed to produce the coverage as shown by the subsectors 1c, 2c, 3c and 4c. This limited angular coverage as shown by the subsectors 1c to 4c is maintained for the remainder of the relevant radar echo return period until the maximum range indicated by the line 18 has been reached. Control of the beam forming circuits 11 to effect the necessary beam narrowing is effected under control of signals from the radar timing unit 8. It will be appreciated that the ranges indicated by the lines 16, 17 and 18 will occur at predetermined times after the transmission of each radar pulse and therefore the beam narrowing operation is initiated by signals from the radar timing circuit 8 at times corresponding to the ranges indicated by the lines 16, and 17.

Apparatus for effecting beam narrowing is shown in FIG. 3 and comprises a plurality of three way switches 19 each having fixed contacts 19a, 19b and 19c, and wipers 19d which are connected one to each of the antennae 9. Signals are fed from the antennae 9 via the switches 19 to Rotman lenses 20, 21 or 22. Thus when the wipers 19d of the switches 19 are contemporaneously set to fixed contacts 19a, the Rotman lens 20 is fed; when the wipers 19d of the switches 19 are set to contacts 19b, the Rotman lens 21 is fed, and when the wipers 19d of the switches 19 are set to the fixed contacts 19c, the Rotman lens 22 is fed. The lenses 20, 21 and 22 are arranged to feed three way switches 23, having fixed contacts 23a, 23b and 23c and a wiper 23d, so that when the lens 20 for example, is fed from the antennae 9 via the switches 19, the wipers 23d of the switches 23 are set to the fixed contacts 23a. In the same way, when the lens 21 or the lens 22 is fed from the switches 19, it is arranged to be selected by the switches 23. The switches 19 and 23 are arranged to be operated simultaneously by switch drive signals fed thereto on lines 24 and 25 and derived from the radar timing unit 8 via delay units 26 and 27. The delay unit 26 provides a delay corresponding to the range indicated by the line 16 in FIG. 1 and at a time after the transmitted radar pulse corresponding to this range, signals on the line 24 are fed to the switches 19 and 23 so that the wipers 19d and 23d simultaneously move from fixed contacts 19a and 23a to fixed contacts 19b and 23b respectively. The delay unit 27 provides an additional delay, so that the cumulative delay afforded by delay units 26 and 27 corresponds to the range indicated by the line 17 and at a time after the transmitted radar pulse corresponding to this range, signals are fed from the delay unit 27 on the line 25 to the switches 19 and 23 so that the wipers 19d and 23d respectively are constrained to move from the fixed contacts 19b and 23b to the fixed contacts 19c and 23c respectively.

Output signals from the switches 23 are fed to the lines 12, 13, 14 and 15 as hereinbefore described thereby to provide signals indicative of targets in the subsectors as shown in FIG. 1.

Although the foregoing example is concerned with a height finder radar, the invention may find application in surveillance and multistatic radar and even in lidar or sonar where the same principles apply.

I claim:

1. A radar, lidar or sonar system comprising a transmitter and a receiver, the receiver including a radar antennae and a plurality of Rotman lenses fed therefrom via a first switch means, said lenses being arranged to feed output lines via a second switch means, said receiver adapted to form a plurality of contiguous receiver beams defining an angular sector of cover; and means for narrowing each of the beams whilst maintaining contiguity thereof including a timing unit means for timing the lapse of time after transmission of each radar pulse from said transmitter and for outputting a timing signal, said means for narrowing including a delay means for delaying the timing signal and for controlling said first and second switch means dependent upon the delayed timing signal, said means for narrowing adapted to reduce in a plurality of discrete steps said angular sector of cover of said plurality of contiguous receiver beams and to increase the range of said plurality of contiguous receiver beams.

2. A system as claimed in claim 1 wherein said Rotman lens is replaced by a Butler matrix or a Blass matrix.

3. A radar system as claimed in claim 2 wherein said means for delaying includes a first and a second delay means, said first switch means being fed a first delayed timing signal from said first delay means, said second switch means being fed a second delayed timing signal from said second delay means.

4. A radar system as claimed in claim 1 suitable for height finding purposes wherein the output lines from said second switch means includes means for providing signals indicative of the height of a target, and said lenses and antennae including means for providing a beam pattern which extends through an angular section in elevation.

* * * * *